United States Patent [19]

Piber

[11] 4,112,282

[45] Sep. 5, 1978

[54] SNAP-IN MEANS FOR MOUNTING ELECTRICAL DEVICES OR THE LIKE IN A SUPPORT PANEL APERTURE

[75] Inventor: Earl T. Piber, Milwaukee, Wis.

[73] Assignee: Cutler-Hammer, Inc., Milwaukee, Wis.

[21] Appl. No.: 827,856

[22] Filed: Aug. 26, 1977

Related U.S. Application Data

[62] Division of Ser. No. 638,811, Dec. 8, 1975, Pat. No. 4,070,559.

[51] Int. Cl.² ............................................ H01H 9/02
[52] U.S. Cl. ................................ 200/296; 174/153 G; 248/27.1; 339/126 RS; 285/321
[58] Field of Search ............ 200/296, 153 G, 153 LA; 339/126 R, 126 RS, 128; 174/153 G, 153 R; 248/27.1, 27.3; 24/3 E, 73 AS, 73 S, 256, 259 R; 285/321

[56] References Cited

U.S. PATENT DOCUMENTS

| 2,689,700 | 9/1954 | Drury | 200/296 |
| 3,285,548 | 11/1966 | Matto | 339/128 |
| 3,345,085 | 10/1967 | Hanes | 285/321 |
| 3,711,669 | 1/1973 | Keranen | 200/153 G |
| 3,941,969 | 3/1976 | Piber | 200/296 |
| 3,987,265 | 10/1976 | Piber | 200/153 G |
| 4,070,559 | 1/1978 | Piber | 200/296 |

FOREIGN PATENT DOCUMENTS

| 1,364,586 | 5/1964 | France. | |
| 2,254,661 | 5/1974 | Fed. Rep. of Germany | 200/296 |
| 662,927 | 12/1951 | United Kingdom | 248/27.3 |

Primary Examiner—Stephen P. Garbe
Attorney, Agent, or Firm—Michael, Best & Friedrich

[57] ABSTRACT

The snap-in mounting means includes a ring-like retainer member disposed in an annular groove provided near the outer end of an elongated bushing which extends from a switch frame member on a switch base of an electrical toggle switch assembly and pivotally supports a toggle lever for actuating switch contacts housed in the switch base. The retainer member is radially compressible and expandable in the bushing groove between a normally expanded position where its outer dimension is larger than the dimension of the mounting hole in a support panel on which a switch assembly is to be mounted and a compressed position where it can pass through the mounting hole.

As the bushing is initially inserted into the mounting hole from the rear of the panel during mounting, a portion of the retainer member engages the rim of the mounting hole and it is cammed thereby to the compressed position inside the groove. After the outer end portion of the bushing has been inserted through the mounting hole, the retainer member returns to its normally expanded position where a portion overlies the front of the panel in the area surrounding the mounting hole and is held in tight engagement therewith by a back-up spring.

7 Claims, 11 Drawing Figures

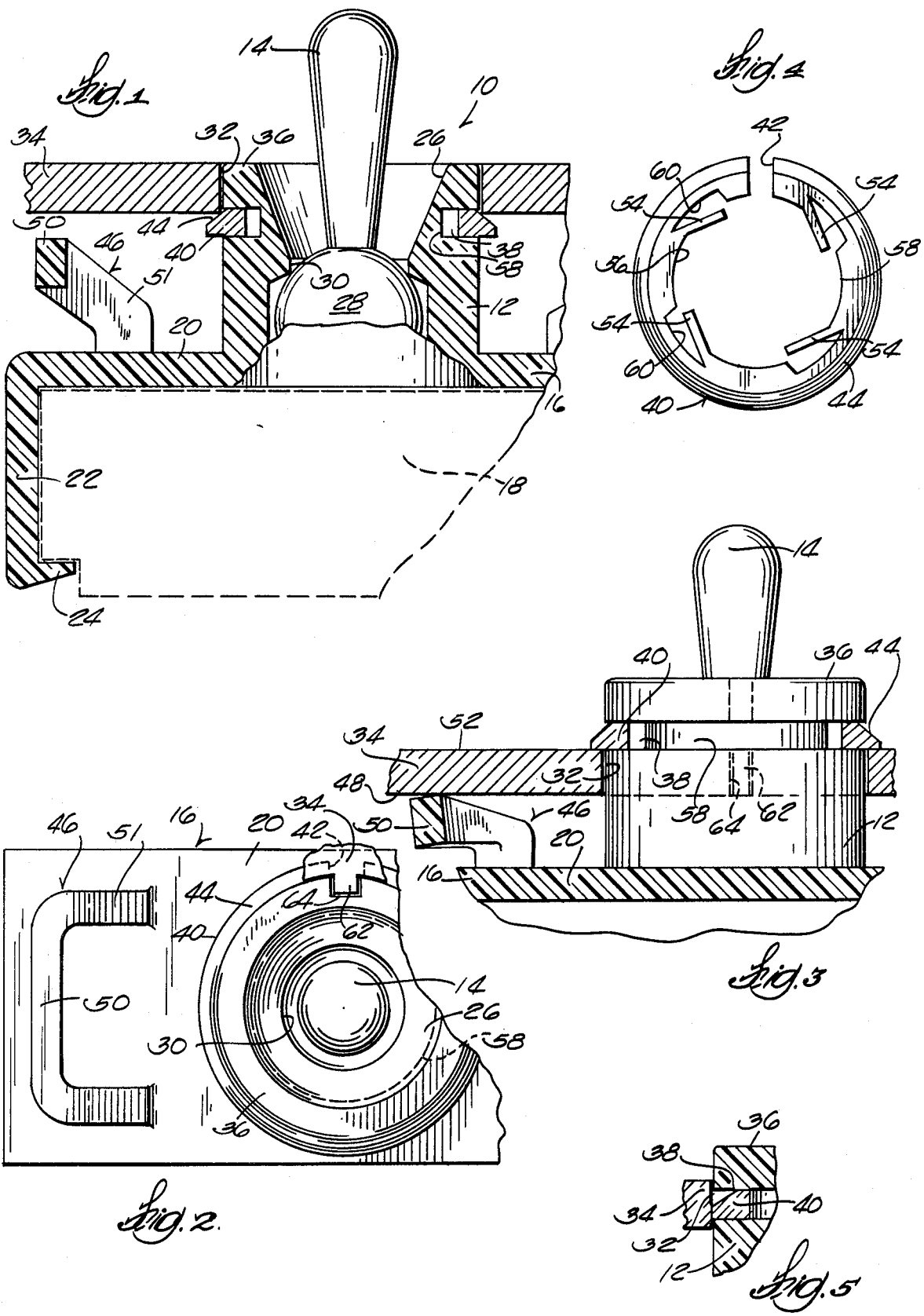

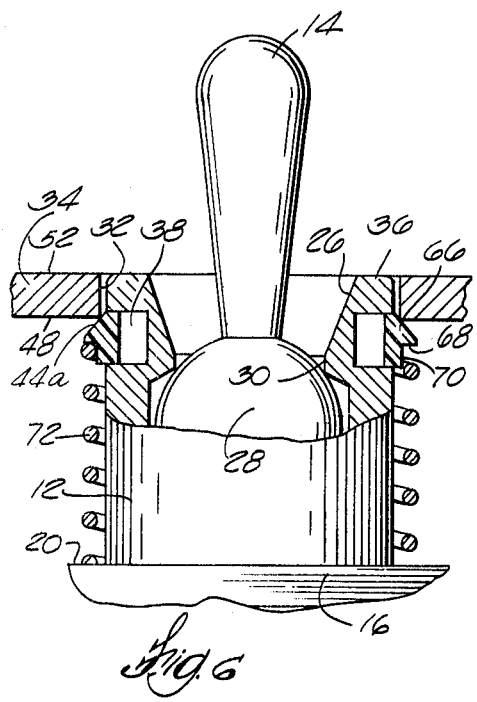
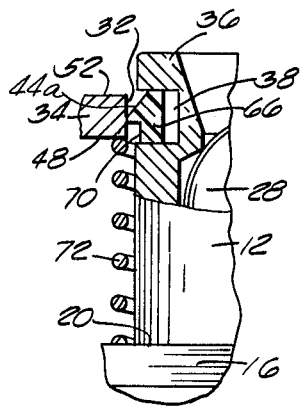
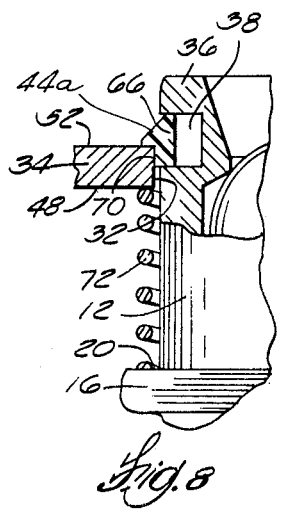
Fig. 6    Fig. 7    Fig. 8
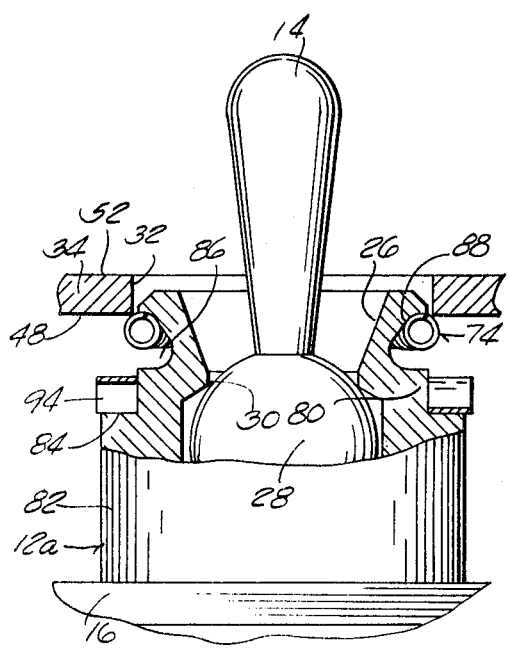
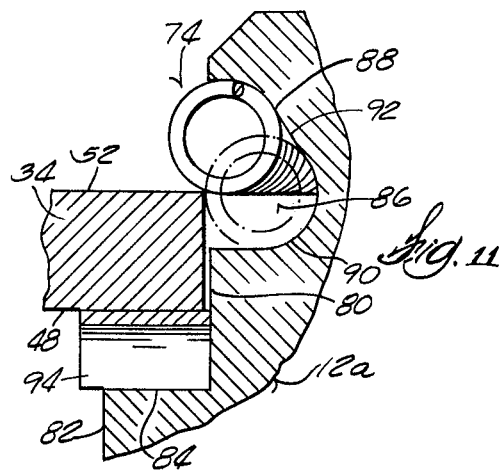
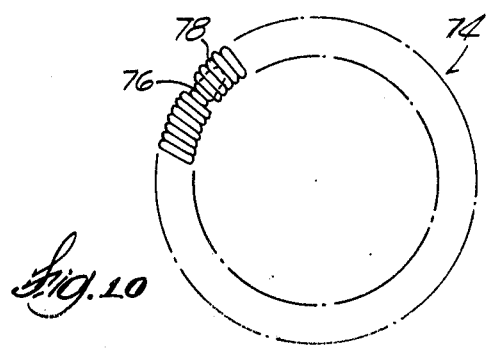
Fig. 9    Fig. 11    Fig. 10

SNAP-IN MEANS FOR MOUNTING ELECTRICAL DEVICES OR THE LIKE IN A SUPPORT PANEL APERTURE

CROSS REFERENCE TO RELATED APPLICATIONS

This application is a divisional of application Ser. No. 638,811, filed Dec. 8, 1975 now U.S. Pat. No. 4,070,559.

BACKGROUND OF THE INVENTION

This invention relates to push-in or snap-in mounting means for mounting a device in the hole of a mounting panel and, more particularly, to such mounting means adapted for use with electrical devices, such as a toggle switch or the like.

Push-in or snap-in mounting means for mounting devices, such as toggle switches and other electrical components, in a hole provided in the bulkhead or support panel are known. Prior art snap-in mounting constructions, particularly for rectangular mounting holes, typically have used biased fingers or the like which grip the edge of the mounting hole when the device is pressed into the mounting hole. Many prior art panel mounting means have relatively complex constructions or require special tools for mounting and are not always completely satisfactory for the snap-in mounting of circular bushings of a toggle switch because the retention or holding strength provided thereby is relatively low, the mounting hole is not completely closed and/or the mount does not provide a smooth and neat appearance at the front of the panel.

SUMMARY OF THE INVENTION

An object of the invention is to provide a snap-in mounting means which is particularly adaptable for electrical switches or the like and is arranged to facilitate simple and quick installation into a mounting hole of a support panel without special tools.

Another object of the invention is to provide a snap-in mounting means for mounting a device, such as an electrical switch or the like, which can be inserted through a circular mounting hole of a support panel from the back of the panel, has a high retaining strength after mounting and presents a smooth and neat appearance at the front of the panel.

A further object of the invention is to provide such a snap-in mount including means for automatically centering the mounted device within the support panel hole.

Other objects, aspects and advantages of the invention will become apparent upon reviewing the following detailed description, the drawings and the appended claims.

The snap-in mounting means provided by the invention includes a bushing having an outer end portion to be received in the mounting hole of a support panel, an annular groove in the outer end portion of the bushing, a ring-like retainer means which is disposed in the bushing groove and is radially compressible and expandable therein between a normally expanded position where its outer dimension is larger than the dimension of a mounting hole and a compressed position where it can pass through the hole. The retainer means is adapted to engage the back rim of the mounting hole as the bushing is initially inserted into the hole and be cammed thereby to a compressed position. After the outer end portion of the bushing has been inserted through the hole, the retainer means returns to its normally expanded position where at least a portion thereof overlies the front of the panel in the area surrounding the mounting hole. The mounting means also includes a biasing means which acts on the back of the panel to urge the bushing in an axial direction away from the back of the panel and thereby pulls the retainer means into tight holding engagement with the front of the panel. Also means are provided for centering the retainer means with respect to the panel mounting hole so that it grips the panel equally around the hole.

The snap-in mounting means of the invention is particularly adaptable for use with a toggle switch assembly including an insulating base housing switch contacts and a switch frame mounted on the base with the bushing, which pivotally supports a toggle lever for actuating the switch contacts, either mounted on the switch frame or formed as an integral part thereof. In one embodiment, the retainer means is a split or snap ring including a beveled leading edge portion adapted for camming the ring into the compressed position as the outer end portion of the bushing is initially inserted into the panel mounting hole during mounting and further including a plurality of circumferentially spaced spring fingers which extend inwardly from the inner periphery of the ring and bear against the inner wall of the bushing groove to evenly space the ring therefrom. A pair of inverted U-shaped resilient elements or members located on the opposite sides of the bushing with the lower ends of each integrally connected to the top of the switch frame and the intermediate portion of each adapted to bear against the back of the panel after mounting can be provided as the biasing means.

In another embodiment, the same general type of beveled split or snap ring is provided but further includes an annular undercut which, prior to mounting, receives the upper end of a coil back-up spring encircling the bushing with the lower end thereof bearing against the top of the switch frame. The coil spring is disengaged from the snap ring as the ring is moved to the compressed condition during mounting and thereafter bears against the back of the panel to act as the biasing means for tightly holding the switch assembly on the panel.

In a further embodiment, the retainer means comprises a helical garter spring and the bushing groove is tapered to guide the garter spring to a center position as it expands to its free state after the bushing has been inserted through the panel mounting hole.

BRIEF DESCRIPTION OF THE DRAWINGS

FIG. 1 is an enlarged fragmentary, partially sectioned, side elevational view of a one-hole, snap-in toggle switch embodying various of the features of the invention, shown in a position ready for installation from the rear of a bulkhead or support panel.

FIG. 2 is a fragmentary top plan view of the toggle switch and the support panel of FIG. 1.

FIG. 3 is a fragmentary, partially sectioned view of the toggle switch assembly of FIG. 1 shown installed on the support panel.

FIG. 4 is a top plan view of the snap ring used as the retainer means for the toggle switch assembly of FIG. 1.

FIG. 5 is a fragmentary, cross sectional view of the toggle switch assembly of FIG. 1 showing the position of the snap ring during insertion of the bushing into the panel mounting hole.

FIG. 6 is a view similar to FIG. 1 illustrating an alternate construction for the snap ring and the back-up spring with the toggle switch assembly shown in a position ready for installation from the rear of a bulkhead or support panel.

FIG. 7 is a fragmentary, partially sectioned view of the toggle switch assembly of FIG. 6 showing the position of the snap ring and the back-up spring during insertion of the bushing into the panel mounting hole.

FIG. 8 is a view similar to FIG. 7 showing the position of the components after the toggle switch assembly has been mounted on the support panel.

FIG. 9 is a view similar to FIG. 1 illustrating an alternate construction of the retaining means, the bushing and the back-up spring, shown with the toggle switch assembly ready for installation from the rear of a bulkhead or support panel.

FIG. 10 is a top plan view of the garter spring used as the retaining means for the toggle switch assembly of FIG. 9.

FIG. 11 is an enlarged fragmentary, sectional view of the toggle switch assembly of FIG. 9 showing in solid lines the position of the garter spring and the back-up spring after the switch assembly has been mounted on the panel.

DESCRIPTION OF THE PREFERRED EMBODIMENTS

Illustrated in FIG. 1 is a toggle switch assembly 10 embodying various of the features of the invention. The toggle switch assembly 10 includes an elongated bushing 12 having a generally circular cross section, a toggle lever 14, a switch frame 16 (illustrated fragmentarily) and an insulating base 18 (illustrated schematically and fragmentarily by dashed lines) which houses electrical contacts (not shown). The toggle lever 14 and the switch base 18 are of conventional design so a detailed illustration and description of the structural features thereof is not necessary for a full understanding of the invention. For example, the Miller U.S. Pat. No. 3,146,330, issued Aug. 25, 1964, discloses a toggle switch assembly including a toggle lever and switch base arrangement adaptable for use in the invention.

The switch frame 16 has a generally rectangular top 20 and a pair of depending legs 22 (one shown), one at each end, for hugging the switch base 18. Located on the lower end of each leg 22 is an inwardly-extending hook 24 which snaps into a notch into the switch base 18 to securely retain the frame on the switch base with the top 20 covering the open top of the switch base.

In the specific construction illustrated in FIGS. 1-5, the bushing 12 is formed integrally with the switch frame 16, such as by molding from a relatively rigid thermoplastic material, e.g., General Electric "Lexan", and extends outwardly therefrom coaxially with a circular aperture (not shown) provided in the switch frame. The bushing 12 has a central bore 26 for receiving the toggle lever 14. If desired, the bushing and the switch frame can be fabricated as separate parts and the bushing fastened on the switch frame by suitable means.

The toggle lever 14 has an external handle and extends through the bushing with the lower or inner end thereof extending into the switch base 18 for actuation of the switch contacts, for example, as disclosed in the above-identified Miller Patent. The toggle lever also includes an enlarged spherical portion 28 which bears against a constricted portion 30 of the bushing bore 26 to afford pivotal movement of the toggle lever relative to the bushing during actuating movement.

The outer diameter of the bushing 12 is sized to permit it to be loosely inserted through, but substantially fill, a circular mounting hole 32 in a bulkhead or support panel 34 on which the switch assembly 10 is to be mounted from the rear. Located near the upper or outer end 36 of the bushing 12 is an annular groove 38 for slidably receiving a split or snap ring 40 made from a relatively rigid and resilient material, such as a metal, reinforced plastic (e.g., glass-filled nylon), etc. In the specific construction illustrated in FIGS. 1-5, the snap ring 40 has a spacing 42 (FIG. 4) and is radially compressible and expandable in its own plane within the bushing groove 38 between a radially inwardly compressed position where it can pass through the support panel mounting hole 32 (FIG. 5) and a normally expanded position where it partially overlies the front of the panel in the area surrounding the panel mounting hole (FIG. 3) and partially remains within the groove.

The leading edge of the snap ring 40 has a tapered or beveled portion 44 which is adapted to engage the back rim of the panel mounting hole 32 (FIG. 1). As the beveled portion 44 engages the rim of the hole during insertion of the outer end portion of the bushing into the mounting hole, the snap ring 40 is cammed into the compressed position inside the bushing groove 38 (FIG. 5).

Extending upwardly and integrally from the top 20 of the switch frame 16 on opposite sides of the bushing 12 is a pair of U-shaped spring members 46 (one shown) which act as back-up springs. Each spring member 46 includes a pair of legs 51 connected to the switch frame at the lower ends and an intermediate portion 50 which bears against the back 48 of the support panel 34 when the switch assembly 10 is mounted. The spring members 46 have some resiliency so they can be deflected when the bushing 12 is inserted into the mounting hole and thereafter apply a biasing force on the back of the support panel to urge the bushing 12 in an axial direction away from the back of the panel. Upon complete insertion of the outer end portion 36 of the bushing through the panel mounting hole, the snap ring 40 returns to its normally expanded position and the biasing force of the spring members 46 pulls the bushing back and thereby holds a portion of the inner or trailing edge of the ring in tight engagement with the front of the panel in the area surrounding the mounting hole (FIG. 3). If desired, the spring members 46 can be formed as an integral part of the switch frame when the latter is molded from a plastic material.

The snap ring 40 illustrated in FIG. 4 is provided with a plurality of circumferentially spaced spring fingers 54 which extend integrally and radially inwardly from the inner periphery 56. The outer ends of these spring fingers bear against the inner vertical wall 58 of the bushing groove 38 and serve to evenly space the snap ring from the groove wall 58, thereby effectively centering the snap ring over the panel mounting hole so that it grips the support panel equally around the hole. To install the snap ring to the bushing groove, it is spread apart sufficiently to permit it to be slipped over the outer end of the bushing. As the snap ring is guided over the outer end of the bushing, the spring fingers 54 are deflected radially outwardly into pockets or recesses 60 provided in the inner periphery 56.

For proper indexing of the switch assembly and/or to prevent the switch assembly from turning after mounting, the support panel 34 normally is provided with a key or lug 62 which fits into an axially extending keyway 64 provided along one side of the bushing 12 (FIG. 2).

In the alternate construction illustrated in FIGS. 6-8, wherein components like those in the construction illustrated in FIGS. 1-5 are identified with the same reference numerals, a modified form of the snap ring and the back-up spring is used. The inner or trailing edge of the snap ring 66 is provided with an annular undercut including a radially extending annular ledge 68 and an axially extending annular shoulder 70 of a reduced diameter. As shown in FIG. 6, a coil or helical back-up spring 72 encircles the bushing 12 and, prior to mounting, it is retained by the snap ring 66. That is, the lower end of the spring 72 bears against the top 20 of the switch frame 16 and the upper end is held beneath the snap ring ledge 68.

As the outer end portion of the bushing is initially inserted into the panel mounting hole during mounting, the tapered or beveled portion 44a of the leading edge of the snap ring 66 engages the back rim of the hole and the snap ring is cammed into the compressed position as described above. When this occurs, the spring 72 is disengaged from the snap ring ledge and abuts the back 48 of the panel 54 (FIG. 7). Upon complete insertion of the outer end portion of the bushing through the mounting hole, the snap ring 66 returns toward its normally expanded position, i.e., by self-expansion, until the shoulder 70 abuts the inner wall of the mounting hole. The biasing force of the spring 72 pulls back the bushing 12 and holds the snap ring ledge 68 in tight holding engagement with the front 52 of the panel in the area surrounding the hole (FIG. 8).

While the snap ring shoulder 70 can serve as the sole means for centering the snap ring over the mounting hole, the snap ring can be provided with the same type of spring fingers as illustrated in FIG. 4 to further assist in centering if desired. Also, the snap ring 40 illustrated in FIGS. 1-5 can be provided with an undercut and axially extending shoulder for centering if desired.

In the alternate construction illustrated in FIGS. 9-11, wherein components like those in the construction illustrated in FIGS. 1-5 are identified with the same reference numerals, a helical garter spring 74 is used in place of a snap ring as the means for retaining the switch assembly on the support panel, the bushing groove is modified to serve as a means for centering the garter spring 74 over the panel mounting hole and a modified form of the back-up spring is used. The helical garter spring 74 has a circular cross section and one end 76 has a reduced diameter so it can be threaded into the other end 78 to form an annular member as shown in FIG. 10. The bushing 12a has a circular cross section and includes an outer end portion 80 having an outer diameter approximately the same as, but slightly smaller than, the inside diameter of the panel mounting hole, an inner end portion 82 having an outer diameter larger than the inside diameter of the panel mounting hole and a radially extending shoulder 84 integrally connecting the outer end portion 80 and the inner end portion 82. When in its free or normally expanded state as shown in FIG. 10, the outermost diameter of the garter spring 74 is larger than the inside diameter of the panel mounting hole.

Located in the outer end portion 80 and near the outer end of the bushing 12a is an annular groove 86 in which the garter spring 74 is disposed. As best shown in FIG. 11, the bushing groove 86 has an outer or upper portion 88 which is arranged to hold the garter spring in its normally expanded position and an inner or lower portion 90 of sufficient depth to permit the garter spring 74 to be moved radially inwardly to a position where the outer end portion of the bushing 12a can be inserted through the panel mounting hole 32. The bushing groove 86 also includes an inner wall 92 which tapers or inclines radially inwardly and downwardly from the upper portion 88 toward the lower portion 90 and along which the inner surface of the garter spring 74 is guided as the spring moves back and forth between the upper and lower end portions of the groove during mounting as explained below.

Encircling the outer end portion 80 of the bushing 12a and resting on the bushing shoulder 84 is an annular compressible, resilient member, such as a wave washer 94, which after mounting bears against the back of the support panel and serves as a back-up spring.

To install the garter spring 74 into the bushing groove 86, it is stretched and slipped over the outer end of the bushing 12a. The garter spring 74, upon being released, returns to its free state or normally expanded position and assumes a position in the upper portion 88 of the groove as shown in FIG. 9. When the outer end portion of the bushing 12a is initially inserted into the panel mounting hole 32, the outer curved surface of the garter spring 74 engages the back rim of the hole (FIG. 9). During continued insertion of the bushing, the garter spring 74 is cammed radially inwardly and moved downwardly along the inclined wall 92 of the bushing groove 86 by the back rim and/or the inner wall of the mounting hole until it reaches the lower groove portion 90 as shown by the dashed lines in FIG. 11. As the approximate center of the garter spring 74 is moved past the front rim of the mounting hole, it springs back, i.e., expands radially outwardly, to its free state or normally expanded position shown by the solid lines in FIG. 11 where a lower portion of the outer curved surface engages the front rim of the panel mounting hole as shown by the solid line in FIG. 11. During this expansion, the garter spring 74 is guided along the inclined inner wall 92 of the bushing groove 86 as it moves upwardly from the lower portion 90 to the upper portion 88 of the groove. Thus, the inclined wall serves to automatically center the garter spring over the panel mounting hole.

After the garter spring 74 has expanded, the biasing force of the wave washer 94, which abuts the back of the panel and is compressed during mounting as shown in FIG. 11, pulls back on the bushing 12a and thereby holds the garter spring in tight engagement with the front rim of the panel mounting hole.

While different back-up springs have been illustrated and described in connection with each of the preferred embodiments, it should be apparent that any of such back-up spring arrangements can be used with any of the embodiments. Also, the bushings and panel mounting holes having shapes other than circular can be used so long as they have complementary shapes. Further, the snap-in mounting means of the invention can be used with devices other than electrical components and with electrical components having actuators other than toggle levers.

From the above-detailed description of the preferred embodiments of the invention, it will be apparent to those skilled in the art that various other changes and modifications can be made thereto to adapt the invention to various uses without departing from the spirit and scope thereof.

I claim:

1. A snap-in mounting means for a device adapting the device to be mounted from the back of and through a hole in a support panel to secure the device to the panel so that part of the device is accessible from the front of the panel comprising
   an elongated bushing carrying the accessible part of the device and having an outer end portion to be received in the panel mounting hole, said bushing outer end portion including an annular groove,
   a split ring which is disposed in said bushing groove, which is radially compressible and expandable within said bushing groove between a normally expanded position where its outer dimension is larger than the dimension of the panel mounting hole and a compressed position where it can pass through the panel mounting hole, and which is adapted to engage the back rim of the panel mounting hole and be cammed thereby to said compressed position as said bushing outer end portion is inserted into the hole during mounting, said split ring returning to its normally expanded position, where at least a portion thereof overlies the front of the support panel in the area surrounding the mounting hole, after said bushing outer end portion has been inserted through the mounting hole,
   and a plurality of circumferentially spaced spring fingers extending inwardly from the inner periphery of said ring and bearing against the inner wall of said bushing groove to evenly space said ring from said groove inner wall when said ring is in said expanded position,
   biasing means adapted to urge said bushing in an axial direction away from the back of the support panel and thereby hold said split ring in tight engagement with the front of the support panel after mounting.

2. A snap-in mounting means according to claim 1 wherein
   said ring has a beveled leading edge portion which is tapered radially downwardly toward the device and is engaged by the back rim of the panel mounting hole as said bushing outer end portion is inserted into the mounting hole during mounting.

3. A snap-in mounting means according to claim 1 wherein
   said biasing means comprises a pair of inverted U-shaped spring members located on opposite sides of said bushing with the inner ends of each connected to a portion of the device and an intermediate portion of each bearing against the back of the panel after mounting.

4. A snap-in mounting means according to claim 3 wherein
   said bushing includes a radially extending shoulder which is axially spaced from said groove and has an outer dimension larger than the dimension of the panel mounting hole, and
   said biasing means comprises an axially compressible spring member with one end bearing against said bushing shoulder and the opposite end bearing against the back of the panel after mounting.

5. In a toggle switch assembly adapted to be snap-in mounted from the back of a panel through a hole in the panel and including an insulated base housing switch contacts, a switch frame covering the base, and a pivotal toggle lever for actuating the switch contacts, wherein the improvement comprises
   an elongated bushing extending outwardly from said switch frame and pivotally supporting said toggle lever, said bushing having an outer end portion adapted to be inserted into the panel mounting hole,
   an annular groove in said bushing outer end portion,
   a split ring which is disposed in said bushing groove, which is radially compressible and expandable in the plane thereof within said bushing groove between a normally expanded position where its outer dimension is greater than the dimension of the panel mounting hole and a compressed position where it can pass through the hole, and which has a beveled leading edge portion which engages the back rim of the hole and serves to cam said ring to said compressed position as said bushing outer end portion is inserted into the hole during mounting, said ring returning to its normally expanded position, where at least a portion thereof overlies the front of the support panel in the area surrounding the mounting hole, after said bushing outer end portion has been inserted through the mounting hole,
   a plurality of circumferentially spaced spring fingers extending inwardly from the inner periphery of said ring and bearing against the inner wall of said bushing to evenly space said ring from said groove inner wall when said ring is in said expanded position, and
   biasing means adapted to urge said bushing in an axial direction away from the back of the support panel and thereby hold said ring in tight engagement with the front of the support panel after mounting.

6. A toggle switch assembly according to claim 5 wherein
   said biasing means comprises a pair of inverted U-shaped spring members located on opposite sides of said bushing with the inner ends of each integrally connected to said switch frame and an intermediate portion of each bearing against the back of the panel after mounting.

7. A toggle switch assembly according to claim 5 wherein
   said bushing includes a radially extending shoulder which is axially spaced from said groove and has an outer dimension larger than the dimension of the panel mounting hole, and
   said biasing means comprises an axially compressible spring member with one end bearing against said bushing shoulder and the opposite end bearing against the back of the panel after mounting.

* * * * *